United States Patent Office 3,294,727
Patented Dec. 27, 1966

3,294,727
EMULSION POLYMERIZATION OF A TERPOLYMER COMPRISING A VINYL ESTER OF AN ALPHA-BRANCHED CARBOXYLIC ACID
Einte P. Grommers and Geert C. Vegter, Amsterdam, Netherlands, assignors to Shell Oil Company, New York, N.Y., a corporation of Delaware
No Drawing. Filed Jan. 16, 1963, Ser. No. 251,767
Claims priority, application Netherlands, Jan. 25, 1962, 273,968
11 Claims. (Cl. 260—29.6)

This invention relates to a process for the preparation of latices by emulsion polymerization of vinyl esters of saturated monocarboxylic acids. More particularly, the invention provides a process for polymerizing vinyl esters of saturated aliphatic monocarboxylic acids branched at the alpha position with alpha-beta-unsaturated carboxylic acids and/or partial esters thereof in an aqueous emulsion containing surfactants.

Specifically, the invention provides a process for preparing mechanically stable, freeze-tolerant latices which comprises polymerizing in aqueous emulsion vinyl esters of alpha-branched saturated aliphatic monocarboxylic acids in the presence of (1) a compound selected from the group consisting of alpha-beta-unsaturated carboxylic acids, mono-alkyl esters of alpha-beta-unsaturated carboxylic acids, monovinyl esters of saturated aliphatic dicarboxylic acids, and the salts and anhydrides of said carboxylic acids and esters, and (2) surfactants consisting essentially of surface-active agents containing one anionic group per molecule and nonionic surface-active agents.

The preparation of latices by emulsion polymerization of vinyl esters, as, for instance, vinyl acetate, is known. Such polyvinyl ester latices are frequently applied in latex paints. For this application plasticizers are often added to reduce the temperature at which the polyvinyl acetate particles can coalesce to a coherent film when the water evaporates. It has also been proposed to achieve an internal plasticizing effect by copolymerizing vinyl acetate with vinyl stearate.

It has now been found that dispersion agent systems recommended for the preparation of vinyl ester latices, generally do not lead to the formation of stable latices when they are used for the emulsion polymerization of branched monocarboxylic acids or for the emulsion copolymerization of such vinyl esters with other vinyl esters such as vinyl acetate or vinyl pivalate. In some cases one can, however, obtain adequate stability by using large quantities of dispersion agents, but at the expense of the water resistance of the paint coats made from such latices.

It is therefore an object of the present invention to provide a process for preparing paint latices by aqueous emulsion polymerization. It is another object to provide a process for preparing vinyl ester latices which are not only suitable for use as paints but also have unexpectedly high resistance to mechanical forces such as vigorous stirring and freeze-thaw resistance and high resistance to chemical influences such as electrolytes and salts. These and other objects will become apparent to those skilled in the art from the following disclosure.

A process has now been found for the preparation of latices that have good stability and are at the same time suitable for making paints that have high resistance to mechanical and chemical influences which comprises polymerizing in aqueous emulsion vinyl esters of alpha-branched saturated aliphatic monocarboxylic acids in the presence of (1) a compound selected from the group consisting of alpha-beta-unsaturated carboxylic acids, carboxylic acids are alpha-beta-unsaturated carboxylic acids, monovinyl esters of saturated aliphatic dicarboxylic acids, and the salts and anhydrides of said carboxylic acids and esters, and (2) surfactants consisting essentially of surface-active agents containing one anionic group per molecule and nonionic surface-active agents.

The characteristic feature is that vinyl esters of saturated aliphatic monocarboxylic acids of which at least some of the carboxyl groups are attached to tertiary and/or quaternary carbon atoms, are polymerized, or copolymerized, in an emulsion in water, in the presence of carboxylic acids or of partial carboxylic esters, which carboxylic acids or partial esters contain two carbon atoms linked by a double bond, at least one of which is directly attached to a carboxyl group, or salts or anhydrides thereof, as well as of surface-active substances containing one anionic group per molecule, as well as of non-ionic surface-active substances. The last-mentioned carboxylic acids are alpha-beta-unsaturated carboxylic acids, such as acrylic acids, methacrylic acid, maleic acid, fumaric acid and itaconic acid. Instead of these carboxylic acids certain partial carboxylic esters can be used, such as monoalkyl esters of maleic acid, fumaric acid and itaconic acid and furthermore monovinyl esters of saturated aliphatic dicarboxylic acids, such as monovinyl succinate. Such acids or partial esters may also be applied in the form of salts, such as sodium, potassium and ammonium salts. Quantities between 0.5 and 5 parts by weight of acid or partial ester per 100 parts by weight of vinyl esters are generally suitable. Preference is given to acrylic acid and maleic acid.

The saturated aliphatic monocarboxylic acids whose carboxyl groups are attached to tertiary and/or quaternary carbon atoms will for the sake of convenience be referred to herein as branched or alpha-branched monocarboxylic acids.

The preferred alpha-branched saturated aliphatic monocarboxylic acids suitable for use in the present invention may be represented by the general formula:

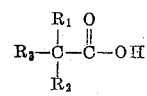

Wherein $R_1$ and $R_2$ each represent the same or different alkyl radicals of normal, branched or cyclic structure and $R_3$ represents hydrogen or a hydrocarbyl radical. In the foregoing formula $R_1$ and $R_2$ each may represent a member of the group consisting, for example, of methyl, ethyl, propyl, butyl, pentyl, octyl, decyl, and the like, radicals. Hydrocarbyl radicals may comprise, for example, alkyl radicals of normal, branched or cyclic structure including methyl, ethyl, propyl, butyl, pentyl, hexyl, octyl, as well as alkaryl, aralkyl and aryl radicals.

Suitable such monocarboxylic acids are those having from 4 to about 20 carbon atoms in the molecule with from about 9 to about 19 being especially preferred.

Under the above-mentioned conditions small quantities of dispersing agents already ensure sufficient stability. Of the anionic surface-active substances a quantity of at least 0.5 part by weight per 100 parts by weight of vinyl esters is also preferably used. In some cases smaller quantities may be applied, but often these are not sufficiently effective. In general, quantities between 0.5 and 2 parts by weight per 100 parts by weight of vinyl esters are preferred.

Suitable surface-active agents that contain one anionic group per molecule are, for instance, alkylaryl sulphonates, such as alkylbenzene sulphonates. Such alkylbenzene sulphonates can be prepared by such known processes as alkylation of benzene with, for instance, propene tetramer, straight-chain olefins, or chlorinated kerosine, followed by sulphonation and neutralization of the resultant sulphonic acid; if so desired, disulphonic acid and sulphuric acid salts may be removed. Other suitable anionic surface-active agents are, for instance, salts of sulphosuccinic esters, such as dihexyl ester, dioctyl ester and ditridecyl ester. Other anionic surface-active agents are, for instance, alkyl sulphonates, alkyl sulphates, sulphates of hydroxyethyl esters of monocarboxylic acids, sulphates of alkylphenoxypolyethoxyethanols, sulphates or sulphonates of hydroxypropyl esters of monocarboxylic acids and sulphates of monoglycerides of monocarboxylic acids. Compounds in this category that contain 12 to 24 carbon atoms per molecule are preferred. Salts of monocarboxylic acids, such as palmitic acid, stearic acid or monocarboxylic acids branched at the alpha position and containing 9–19 carbon atoms per molecule may also be considered. Furthermore, if so desired, mixtures of the aforesaid anionic surface-active agents can be applied.

Suitable nonionic surface-active agents are, for instance, reaction products of hydroxy compounds with one or more alkylene oxides, such as ethylene oxide and propylene oxide. Very suitable are reaction products of phenols with alkylene oxides, such as reaction products of the general formula:

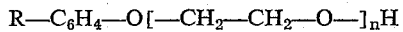

in which R stands for an alkyl group with 6–16 carbon atoms and $n$ is a number between 6 and 40. Compounds in which R represents an octyl or a nonyl group are preferred. Such compounds can be prepared by known means by alkylation of phenol with olefins, such as diisobutene or propene trimer, followed by reaction with ethylene oxide. This generally yields mixtures of reaction products, which mixtures may be effectively characterized by the average length of the ethene-oxy chain.

Other suitable nonionic surface-active agents are reaction products of ethylene oxide with polypropylene glycol ethers. Compounds obtained by reaction of 60–90 parts by weight of ethylene oxide per 100 parts by weight of product, are preferred.

Other suitable nonionic surface-active agents are reaction products of ethylene oxide with monocarboxylic acids, such as lauric acid, palmitic acid, stearic acid or mixtures of fatty acids; furthermore, reaction products of ethylene oxide with alcohols, such as octyl alcohol, lauryl alcohol or cetyl alcohol.

If desired, mixtures of the above-mentioned nonionic surface-active agents may also be applied. The quantity of nonionic surface-active substance or substances may, in general, be between 0.5 and 6% by weight, as referred to vinyl esters. Amounts between 1 and 3% by weight are preferred.

According to the invention the above-mentioned dispersion systems may be used for emulsion polymerization of vinyl esters of branched monocarboxylic acids, or for emulsion copolymerization of various mixtures of vinyl esters of branched monocarboxylic acids with other vinyl esters. Such vinyl esters may be prepared by known means from the monocarboxylic acids, for instance by reaction of the acids with acetylene in the presence of zinc silicates, cadmium silicates or mercury compounds. Many vinyl esters can also be prepared by reaction of the acid with vinyl acetate in the presence of a mercury salt.

As saturated aliphatic monocarboxylic acids in which the carboxyl groups are attached to tertiary and/or quaternary carbon atoms use may well be made of the monocarboxylic acids which are obtained by the reaction of formic acid, or of carbon monoxide and water, with olefins under the influence of liquid acid catalysts such as sulphuric acid, phosphoric acid or complex compounds of phosphoric acid, boron trifluoride and water. Such monocarboxylic acids can also be prepared in the presence of the catalysts just mentioned by the reaction of formic acid, or of carbon monoxide and water, with paraffins, if hydrogen acceptors are also present. As hydrogen acceptors may serve olefins and, furthermore, compounds from which olefins are easily formed, such as alcohols and alkyl halides. Monocarboxylic acids branched at the alpha position can also be obtained according to Reppe's method. Of particular value are the acids from mono-olefins with 8–18 carbon atoms. Preferably, mixtures of olefins obtained by cracking paraffinic hydrocarbons, for instance, mineral oil fractions are used as base materials. These mixtures may contain both branched and unbranched acyclic olefins as well as cyclo-aliphatic olefins. By the reaction with formic acid, or with carbon monoxide and water, a mixture of saturated acyclic and cyclo-aliphatic monocarboxylic acids is obtained therefrom. The base material may also be olefins obtained by polymerization of lower olefins, for instance dimers, trimers or tetramers of propene, or else dimers of isobutene.

By a correct choice of monomeric vinyl esters one may obtain a polymer dispersion of which the particles in the paint coat may coalesce already at room temperature as the water evaporates. This may be achieved, for instance, by starting from vinyl esters of branched monocarboxylic acids containing at least seven carbon atoms per molecule, together with vinyl acetate. If the branched monocarboxylic acids contain 9–11 carbon atoms per molecule, the desired results may be expected if 40–100 parts by weight of the vinyl esters thereof are combined with 100 parts by weight of vinyl acetate. If, furthermore, the branched monocarboxylic acids have been prepared from an olefin fraction obtained by cracking a paraffinic crude oil, and which fraction consisted largely of alkenes with 8–10 carbon atoms per molecule, preferably 60–100 parts by weight of vinyl esters thereof are used per 100 parts by weight of vinyl acetate.

Other vinyl esters that may be used together with vinyl acetate are those derived from the following branched monocarboxylic acids: acids prepared by the reaction of carbon monoxide and water with cracked olefins containing 6–8 carbon atoms per molecule, with cracked olefins containing 12–14 carbon atoms per molecule, with cracked olefins containing 14–18 carbon atoms per molecule, with propene trimer or with propene tetramer.

The above-mentioned vinyl esters of branched monocarboxylic acids contianing at least seven carbon atoms per molecule can also be applied together with vinyl pivalate. If the branched monocarboxylic acids then contain 9–11 carbon atoms per molecule, 70–300 parts by weight of vinyl esters per 100 parts by weight of vinyl pivalate are preferably applied. In such cases the anionic surface-active agent used is preferably an alkylaryl sulphonate and the alpha-beta-unsaturated acid is acrylic acid.

The above-mentioned vinyl esters of branched monocarboxylic acids containing at least seven carbon atoms per molecule can also be very suitably applied together with vinyl esters of acids obtained by the reaction of carbon monoxide and water with diisobutene.

Furthermore, as the only vinyl esters present one may use one or more vinyl esters of branched monocarboxylic acids prepared by the action of liquid acid catalysts from carbon monoxide and water, and cracked olefins containing 5–8 carbon atoms per molecule.

Mixtures of vinyl esters described in the preceding paragraphs may as such be used separately, or, if so desired, in combination, for instance vinyl esters of branched acids from cracked olefins containing 5–10 carbon atoms per molecule, together with vinyl pivalate and vinyl esters of branched acids from cracked olefins containing 9–11 carbon atoms per molecule.

Monomeric vinyl esters and their relative proportions, if appropriately chosen, may also allow polymer particles formed therefrom to coalesce at temperatures other than room temperature, for instance in the preparation of latices for baking enamels, for glues, or for the manufacture of such articles as sheets, plates and the like.

The polymerization or copolymerization may be initiated and/or catalyzed by conventional means. As a rule substances are added that produe radicals, such as peroxides, for instance benzoyl peroxide and ditertiary butyl peroxide, other per compounds, such as potassium persulphate and hydrogen peroxide, and diazo compounds, such as alpha, alpha'-azo-isobutyric nitrile. Redox systems are also often utilized. The temperature is usually between 30 and 150° C., in particular between 50 and 90° C. The polymerization can further be promoted by irradiation, in particular by ultra-violet light.

Polymerization and copolymerizatoin of the vinyl ester mixtures concerned are generally exothermic. If the process is carried out at atmospheric pressure, initiator, temperature and other reaction conditions are preferably chosen such that during polymerization hardly if any boiling occurs. The process can also be carried out under increased pressure. Polymerization is preferably effected with exclusion of oxygen and light. To this end such base materials as water and vinyl esters can previously be freed of oxygen, for instance by boiling or distillation, while indifferent oxygen-free gases, such as nitrogen, helium, argon or neon, are passed through. The air is preferably expelled from the reaction apparatus beforehand by one of the above-mentioned inert gases.

The polymerization can furthermore be carried out in many ways, either batchwise or continuously, while material is continuously fed in and discharged. If a batch process is chosen all the components may be combined, after which polymerization is caused to proceed by adjusting the temperature. If so desired, one or more of the components may also be added gradually during polymerization, or else in portions. Preferably a vinyl ester monomer emulsion is first prepared at a temperature at which no polymerization takes place; after that part of the monomer emulsion can be heated in the reactor to a temperature at which polymerization occurs, and then the remainder of the monomer emulsion can gradually be added. One can also first heat water in the reactor, if so desired with dispersing agents and initiator, to the reaction temperature, after which monomer emulsion is gradually admixed. The time required for complete polymerization depends on the initiator system chosen and on the temperature and may vary from some dozens of minutes to several hours.

Very suitable are also continuous methods in which, during polymerization, material is continuously fed in and discharged, the mixture being kept homogeneously distributed in one or more reaction chambers, the composition of the mixture remaining almost constant in each reaction chamber. In such cases, too, a monomer emulsion containing all the constituents is preferably made beforehand. In this manner the temperature and other reaction conditions can be kept very steady. Generally, for such continuous processes one reactor is sufficient. If desired, a series of two or more of such reactors may be employed, in which, for instance in the second and following reactors, different temperatures may be maintained. However, a latex which after polymerization in one reactor as described above still contains small quantities of monomeric vinyl esters, may be passed, to complete the polymerization, through a tubular reactor maintained at the appropriate temperature, for instance a temperature that is 5–10° C. higher than the temperature in the main reactor.

The monomer emulsion to be polymerized can also be passed through one or more tubular reactors in each of which, or in separate parts of which uniform temperatures can be maintained by heating and/or cooling.

Latices prepared according to the invention are distinguished from polyvinyl acetate latices by their higher stability towards hydrolysis and saponification. Generally, they are very stable in storage, when shaken or stirred, and highly resistant to the action of solutions of salts containing univalent and/or polyvalent ions, and also to repeated freezing and thawing. Stability and resistance are here taken to mean the absence of coagulum, skins or lumps and the like, either in the latex itself, or on the surface in contact with air, or in contact with sides of reactors, transport lines or storage vessels under the above-mentioned conditions.

Latices prepared according to the invention can be worked up to paints by many recipes, by the addition of pigments, fillers, thickeners and the like. The addition of anti-foaming agents is in some cases to be recommended. Pigments and other auxiliaries can be worked up to pigment pastes, which can be homogenized by known means and subsequently mixed with latices according to the invention.

Latices according to the invention and latex paints in which they are incorporated adhere very well to many materials, such as wood (also after application of a primer), stone, concrete and asbestos cement.

Coats obtained with such paints excel by reason of their high stability against chemical and mechanical influences; they have lower water absorption, they stand up very well to the action of alkaline substances, such as concrete, or alkaline detergents; they are also highly resistant to wet brushing with water or with detergents.

Such paint coats retain their good properties also when they have been exposed for long periods to high temperatures, such as a 50° C., or to ultra-violet irradiation.

The invention is elucidated by some examples. The parts mentioned therein are parts by weight, unless otherwise stated. Some of the testing methods are described more fully.

Stability to stirring was tested by stirring 50 ml. of latex in a plastic beaker with a horizontal metal disc, diameter 3 cm., thickness 1.5 mm., the bottom surface of which was kept 1.5 cm. above the bottom of the beaker. The speed was 10,000 revolutions per minute. Stability to stirring was rated as excellent if no coagulation occurred within 30 minutes' stirring.

The ion stability of latices was tested by adding an equal volume of 5% solutions of salts, such as sodium chloride, calcium chloride and potassium aluminum sulphate.

To assess freezing/thawing stability latices were kept for 24 hours at −20° C. and then 24 hours at room temperature. This treatment was repeated five times.

To test their resistance to wet brushing pigmented latex paints were applied by brush to roughened glass plates. A nylon brush, with an area of 21 cm.$^2$ and loaded with a weight of 500 g. was moved mechanically over the paint coat, which was kept constantly wetted with water. The number of strokes with the brush after which the paint cracks is a measure of mechanical stability. Brush stability is rated as excellent if the coat of paint is still perfectly intact after 10,000 strokes.

For the preparation of the branched monocarboxylic acids ($C_9$–$C_{11}$ per molecule) the base material was a mixture of olefins with 8–10 carbon atoms per molecule and which had been obtained by thermal cracking of a paraffinic crude in the gas phase, in the presence of steam. The branched monocarboxylic acids were obtained by the reaction of this olefin fraction with carbon monoxide and water in the presence of a catalyst prepared from phosphoric acid, boron trifluoride and water.

The vinyl esters of the said branched monocarboxylic acids were obtained by reactions of the acids with vinyl acetate in the presence of a mercury salt. Vinyl pivalate was similarly prepared from pivalic acid. The vinyl esters were distilled in a stream of nitrogen and then stored with exclusion of air.

EXAMPLE I

A. Preparation and examination of vinyl ester latex

In 100 parts of water were dissolved 0.5 part of potassium persulphate,
0.5 part of borax,
1.0 part of alkylaryl sulphonate,
2.0 parts of octylphenoxypolyethoxyethanol averaging 8 ether groups per molecule.

The air was expelled by nitrogen. In this solution a mixture of 56 parts of vinyl acetate, 43 parts of vinyl esters of branched monocarboxylic acids ($C_9$–$C_{11}$) and 1.0 part of acrylic acid was emulsified with vigorous stirring.

A glass reaction vessel was heated to 70° C. The air was expelled by nitrogen. 20 parts of monomer were passed into the vessel. The temperature rose on account of the exothermic polymerization reaction. The 180 parts of monomer emulsion were stirred in gradually in the course of 45 minutes; by controlling the feed rate the temperature was maintained at 75° C. The latex was kept for another half hour at 75° C. and then cooled down to room temperature in the reaction vessel. Polymerization was quantitative.

0.5 part of 2-ethylhexanol was admixed as anti-foaming agent. The pH was 4.8; this was raised to 8 by 10% ammonia. By light scattering measurement the average diameter of the polymer particles was found to be 2400 A. The content of solid matter was reduced to 45% by dilution with water. The viscosity, measured 24 hours after dilution, was 18 cp.

Stability to stirring, resistance to sodium chloride and calcium chloride and freezing/thawing stability were investigated and found to be excellent. Latex films of a thickness of 150 microns on glass plates, after drying at temperatures above 10° C., produced transparent coatings.

B. Preparation and examination of white pigmented paint

A paste of pigment was prepared from 140 parts of water, 6.85 parts of a 25% solution of sodium salt of carboxylated poly electrolyte (Tamol 731), 1.02 parts of isooctylphenylpolyethoxyethanol (Triton X 102), 60 parts of a 2% solution of methyl cellulose, 5 parts of preservative and 350 parts of pigment. The composition of the pigment was 5 parts of titanium white (rutile), 1 part of China clay and 1 part of talc. The paste was homogenized on a paint triple roll mill.

The homogenized paste was slowly stirred into 393 parts of latex. The pigment volume concentration of this paint was 35%, the viscosity 8 poises. The paint was stable at room temperature.

The latex paint was brushed on to sand-blasted glass plates. After 1 week's drying at room temperature the paint film was proof against 24 hours' exposure to 2% sodium hydroxide solution. Its resistance to wet brushing was excellent; even when the water with which the paint layer was wetted contained 0.5% of a detergent with secondary alkyl sulphate, the paint coat still stood up to an average of 3,000 strokes.

The white latex paint was applied in two layers to panels of matured concrete. The panels were placed in water; the paint coat was 5 mm. above the surface of the water. After a fortnight the coat of paint was evaluated. Its adhesion was excellent; the paint coat did not chalk and remained a clear white. Finishing coats of latex paints prepared similarly from polyvinyl acetate latices, however, had after some days already partially saponified, chalked distinctly and displayed yellow spots.

EXAMPLE II

In 100 parts of water were dissolved 0.5 part of potassium persulphate,
0.5 part of borax,
1 part of dodecylbenzenesulfonate
2 parts of nonylphenoxypolyethoxyethanol averaging 20 ether groups per molecule.

The air was expelled by nitrogen. In this solution a mixture of 56 parts of vinyl acetate, 43 parts of vinyl esters of branched monocarboxylic acids ($C_9$–$C_{11}$) and 1 part of acrylic acid was emulsified with vigorous stirring.

Polymerization was carried out as described in Example I, the monomer emulsion being added in 6 hours, however. Here, too, 0.5 part of 2-ethylhexanol was added; the pH was adjusted to 8 with ammonia. The average particle size was 4200 A. The viscosity, measured 24 hours after dilution with water to 45% of solid matter, was 33 cp.

Stability to stirring, against sodium chloride, calcium chloride and potassium aluminum alum, and against freezing, was excellent. A white-pigmented paint, prepared from the above-mentioned latex and the pigment paste according to Example I, produced films of paint with excellent resistance to dilute caustic solution and to wet brushing. As concrete paint it also yielded excellent results.

EXAMPLE III

A monomer emulsion was prepared according to the recipe of Example II. This emulsion was passed at a rate of 24 ml. per hour into a reactor, which was maintained at 75° C. The volume of the reactor was 200 ml. The dispersion in the reactor was kept homogeneous by stirring. To complete the polymerization the dispersion was passed through a tube having a volume of 12 ml. and kept at 80° C. The latex was then cooled down to room temperature, 0.5 part of 2-ethylhexanol was added and the pH adjusted to 8 with ammonia.

This latex displayed excellent stability to stirring, against sodium chloride, calcium chloride and potassium aluminum sulphate and against freezing. A white pigmented paint prepared as described in Example I, yielded excellent results when used as a concrete paint.

EXAMPLE IV

Example III was repeated. The monomer emulsion was this time passed into the reactor at a rate of 100 ml. per hour, however. The properties of the resultant latex and the latex paint prepared therefrom were practically the same.

EXAMPLE V

In 100 parts of water were dissolved 0.5 part of potassium persulphate,
0.5 part of borax,
1 part of dodecylbenzenesulfonate,
3 parts of nonylphenoxypolyethoxyethanol averaging 20 ether groups per molecule.

The air was expelled by nitrogen. In this solution a mixture of 29 parts of vinyl pivalate, 69 parts of vinyl esters of branched monocarboxylic acids ($C_9$–$C_{11}$) and 2 parts of acrylic acid was emulsified with vigorous stirring.

The polymerization was carried out as described in Example I. After addition of 0.5 part of 2-ethylhexanol the pH was adjusted to 8.9 with ammonia.

The stability to stirring, against sodium chloride and calcium chloride and against freezing was excellent. The pH had dropped in two weeks at 50° C. to 8.4 and remained constant thereafter.

A white pigmented paint, made in the same way as described in Example I, showed excellent results when used as a concrete paint.

EXAMPLE VI

In 100 parts of water were dissolved 0.5 part of potassium persulphate,
0.5 part of borax,
1 part of alkylaryl sulphonate SF 78,
2 parts of nonylphenoxypolyethoxyethanol averaging 20 ether groups per molecule.

After the air had been expelled with nitrogen, a mixture of 56 parts of vinyl acetate and 43 parts of vinyl esters of branched monocarboxylic acids ($C_9$–$C_{11}$) and 1 part of maleic anhydride was emulsified in the solution, which was vigorously stirred.

The polymerization was carried out as in Example I; after addition of 0.5 part of 2-ethylhexanol the pH was adjusted to 9 with ammonia. Stability to stirring, against admixed salt solutions and freezing was excellent.

A white pigmented paint prepared as described in Example I produced very good results as a concrete paint.

EXAMPLE VII

In 60 parts of water were dissolved 0.5 part of potassium persulphate,
0.5 part of borax,
1 part of dodecylbenzenesulfonate,
2 parts of nonylphenoxypolyethoxyethanol averaging 20 ether groups per molecule.

The air was expelled by nitrogen. In this solution, a mixture of 56 parts of vinyl acetate, 43 parts of vinyl esters of branched monocarboxylic acids ($C_9$–$C_{11}$) and 1 part of acrylic acid was emulsified with vigorous stirring.

A glass reaction vessel was heated to 75° C. The air was expelled by nitrogen. 40 parts of deaerated water were introduced into the vessel. The monomer emulsion was then stirred in gradually in the course of 4 hours, the temperature being maintained at 75° C. After the latex had been kept for another half hour at 75° C., it was cooled down to room temperature in the reaction vessel. The pH was adjusted to 8 with ammonia. The average particle size was 1900 A.

The stability of this latex was excellent. A white pigmented paint prepared as described in Example I gave excellent results as a concrete paint.

EXAMPLE VIII

In 60 parts of water were dissolved 0.17 part of potassium persulphate and 2 parts of nonylphenoxypolyethoxyethanol averaging 20 ether groups per molecule. The air was expelled by nitrogen. In this solution, stirred vigorously, a mixture of 56 parts of vinyl acetate, 43 parts of vinyl esters of branched monocarboxylic acids ($C_9$–$C_{11}$) and 1 part of acrylic acid was emulsified.

40 parts of water, 1 part of alkylaryl sulphonate SF 78, 0.5 part of borax and 0.33 part of potassium persulphate were introduced into a glass reaction vessel. The air was expelled by nitrogen. After the reaction vessel had been heated to 75° C., the monomer emulsion was gradually added in 4 hours. The latex was kept for another ½ hour at 75° C., and then cooled down to room temperature. The pH was adjusted to 8 with ammonia. The average particle size was 1600 A.

The stability of this latex was excellent. A white pigmented paint, prepared as described in Example I, gave excellent results as a concrete paint.

EXAMPLE IX

In 40 parts of water were dissolved 0.22 part of potassium persulphate and 2 parts of nonylphenoxypolyethoxyethanol averaging 20 ether groups per molecule. The air was expelled by nitrogen. In this solution, stirred vigorously, a mixture of 56 parts of vinyl acetate, 43 parts of vinyl esters of branched monocarboxylic acids ($C_9$–$C_{11}$) and 1 part of acrylic acid was emulsified.

60 parts of water, 1 part of alkylaryl sulphonate SF 78, 0.7 part of borax and 0.44 part of potassium persulphate were introduced into a glass reaction vessel. The air was expelled by nitrogen. After the reaction vessel had been heated to 75° C., the monomer emulsion was gradually added in 75 minutes. The latex was kept for another ½ hour at 75° C., and then cooled down to room temperature; 0.5 part of 2-ethylhexanol was added; the pH was adjusted to 8 with ammonia. The average particle size was 1300 A.

The stability of this latex was excellent. A white pigmented paint, prepared as described in Example I, yielded excellent results as a concrete paint.

EXAMPLE X

In 100 parts of water were dissolved 0.5 part of potassium persulphate,
0.5 part of borax,
1 part of dodecylbenzenesulfonate,
3 parts of nonylphenoxypolyethoxyethanol averaging 20 ether groups per mole.

The air was expelled by nitrogen. In this solution, stirred vigorously a mixture of 72 parts of vinyl esters of branched monocarboxylic acids ($C_9$–$C_{11}$), 26 parts of vinyl esters of branched monocarboxylic acids ($C_9$) (obtained by the reaction of diisobutene with carbon monoxide and water in the presence of a catalyst prepared from phosphoric acid, boron trifluoride and water), and 2 parts of acrylic acid was emulsified.

The polymerization was carried out as described in Example I. The pH of the latex was adjusted to 8 with ammonia. The stability of this latex was excellent. A white-pigmented paint, prepared according to Example I, yielded excellent results as a concrete paint.

EXAMPLE XI

In 100 parts of water were dissolved 0.5 part of potassium persulphate,
0.5 part of borax,
1 part of dodecylbenzenesulfonate,
3 parts of nonylphenoxypolyethoxyethanol averaging 20 ether groups per molecule.

The air was expelled by nitrogen. In this solution, stirred vigorously, a mixture of 78 parts of vinyl esters of branched monocarboxylic acids ($C_7$–$C_9$; obtained by the reaction of cracked olefins having 6–8 carbon atoms per molecule with carbon monoxide and water in the presence of a catalyst prepared from phosphoric acid, boron trifluoride and water) and 2 parts of acrylic acid was emulsified.

The polymerization was carried out according to Example I. The pH of the latex was adjusted to 8 with ammonia. The stability of the latex was excellent. A white pigmented paint, prepared as described in Example I, yielded excellent results as a concrete paint.

We claim as our invention:

1. A process for preparing mechanically stable, freeze-tolerant latices which comprises polymerizing in aqueous emulsion (1) vinyl esters of alpha-branched saturated monocarboxylic acids, said acids having the formula:

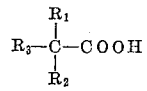

wherein $R_1$ and $R_2$ are alkyl radicals, $R_3$ is selected from the group consisting of hydrogen and alkyl radicals and $R_1$, $R_2$ and $R_3$ contain a total of from 2 to 18 carbon atoms with (2) a copolymerizable vinyl ester in the presence of (3) from 0.5% to 5% by weight of the vinyl esters of an alpha, beta-unsaturated carboxylic acid and (4) surfactants consisting essentially of surface-active agents containing one anionic group per molecule and nonionic surface-active agents.

2. A process for preparing mechanically stable, freeze-tolerant latices which comprises polymerizing in aqueous emulsion (1) vinyl esters of mixed alpha-branched saturated aliphatic monocarboxylic acids, said acids having the formula

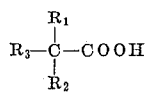

wherein $R_1$ and $R_2$ are alkyl radicals, $R_3$ is selected from the group consisting of hydrogen and alkyl radicals and $R_1$, $R_2$ and $R_3$ contain a total of from 2 to 18 carbon atoms, and said acids containing from 9 to 11 carbon atoms and prepared by reacting monoolefins with carbon monoxide and water in the presence of acid catalysts with (2) vinyl acetate in the presence of (3) from 0.5% to 5% by weight of the vinyl esters of acrylic acid and (4) a surfactant combination consisting essentially of an (A) alkylaryl sulfonate and (B) a reaction product of an alkylphenol with ethylene oxide, said reaction product having the general formula:

$$R—C_6H_4—O—(CH_2—CH_2—O)_n—H$$

wherein R is an alkyl group with from 6 to 18 carbon atoms and $n$ is a number between about 6 and 40.

3. A process as in claim 1 wherein the vinyl esters have been obtained from alpha-branched saturated aliphatic monocarboxylic acids containing from 9–19 carbon atoms in the molecule and prepared by reacting olefins with a member of the group consisting of (1) formic acid and (2) carbon monoxide and water.

4. A process as in claim 1 wherein the copolymerizable vinyl ester is vinyl acetate.

5. A process as in claim 1 wherein the copolymerizable vinyl ester is vinyl pivalate.

6. A process as in claim 1 wherein the alpha-beta-unsaturated carboxylic acid is acrylic acid.

7. A process as in claim 1 wherein the anionic surface-active agent is an alkylaryl sulfonate.

8. A process as in claim 1 wherein the nonionic surface-active agents are reaction products of hydroxy compounds with alkylene oxides.

9. A process as in claim 8 wherein the hydroxy compounds are phenols.

10. A process as in claim 1 wherein the nonionic surface-active agent is the reaction product of an alkylphenol with ethylene oxide, said reaction product having the general formula:

$$R—C_6H_4—O—(CH_2—CH_2—O)_n—H$$

wherein R is an alkyl group with from 6 to 18 carbon atoms and $n$ is a number between about 6 and 40.

11. A process for preparing mechanically stable, freeze-tolerant latices which comprises polymerizing in aqueous emulsion (1) vinyl esters of mixed alpha-branched saturated aliphatic monocarboxylic acids, said acids having the formula

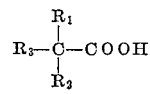

wherein $R_1$ and $R_2$ are alkyl radicals, $R_3$ is selected from the group consisting of hydrogen and alkyl radicals and $R_1$, $R_2$ and $R_3$ contain a total of from 2 to 18 carbon atoms, and said acids containing from 9 to 11 carbon atoms and prepared by reacting monoolefins with carbon monoxide and water in the presence of acid catalysts with (2) vinyl pivalate in the presence of (3) from 0.5% to 5% by weight of the vinyl esters of acrylic acid and (4) a surfactant combination consisting essentially of an (A) alkylaryl sulfonate and (B) a reaction product of an alkylphenol with ethylene oxide, said reaction product having the general formula:

$$R—C_6H_4—O—(CH_2—CH_2—O)_n—H$$

wherein R is an alkyl group with from 6 to 18 carbon atoms and $n$ is a number between about 6 and 40.

References Cited by the Examiner

UNITED STATES PATENTS

| | | | |
|---|---|---|---|
| 2,310,780 | 2/1943 | Hanford et al. | 260—85.7 |
| 3,112,282 | 11/1963 | Jones et al. | 260—29.6 |
| 3,186,974 | 6/1965 | Verbeg | 260—78.5 |

FOREIGN PATENTS

| | | |
|---|---|---|
| 614,970 | 12/1962 | Belgium. |
| 1,330,746 | 5/1963 | France. |

MURRAY TILLMAN, *Primary Examiner.*

P. LIEBERMAN, *Assistant Examiner.*